Aug. 29, 1961   W. J. O'BRIEN ET AL   2,997,746
METHOD OF MAKING ROUGHENED RUBBER PRODUCT
Original Filed Aug. 1, 1955   2 Sheets-Sheet 1

INVENTORS
William J. O'Brien
Armand J. Agostinelli
Rockwell - 
ATTORNEYS

United States Patent Office 2,997,746
Patented Aug. 29, 1961

2,997,746
METHOD OF MAKING ROUGHENED RUBBER PRODUCT
William J. O'Brien, Hamden, and Armand J. Agostinelli, East Haven, Conn., assignors to The Seamless Rubber Company, New Haven, Conn., a corporation of Connecticut
Original application Aug. 1, 1955, Ser. No. 525,617. Divided and this application Feb. 7, 1958, Ser. No. 713,960
6 Claims. (Cl. 18—58.7)

This invention relates to a method for the manufacture of elastomeric and plastic articles having novel surface effects and to the resulting products. The demand for dipped articles of rubber and similar materials for ornamental or friction resistant surface characteristics has resulted in the development of a number of processes designed to produce irregularities in the surface of the articles being treated. For example, dipped articles such as surgeons' gloves have been treated with acids and other chemicals which have an etching effect on the surface of the articles producing pits and embossments having certain characteristics.

The methods heretofore used have not been fully satisfactory since they tend to have a weakening effect and substantially alter the internal structure of the article particularly where the material is of limited thickness.

One method which has heretofore been used to some extent in producing surface irregularities is by the use of salts which are sprinkled or dusted on to molds of uncoagulated latex producing local shrinkage through coagulation and resulting in a corrugated effect on the surface. Such methods leave much to be desired as they likewise result in a substantial modification of the internal structure of the articles being treated.

It is a main object of the present invention to provide a novel method of providing roughened surfaces of rubber or other materials without weakening the internal structure or body of the article.

In general, articles of latex such as rubber gloves are made by dipping a suitable form of porcelain or other material into a bath of latex containing a vulcanizing agent whereafter the form is lifted out of the bath, dipped into a bath of a coagulant and then given a second coating of latex. After this second dip in latex, followed by one or more dips, the coating is dried on the form, the edge at the wrist rolled to form a bead and after heating for a period sufficient to cure the rubber material, the glove is stripped off the form, dried in a tumbling barrel and then turned right side out.

It has been found according to the present invention that a superior form of friction resistant or roughened surface may be provided on elastomeric plastic articles, such as rubber gloves, etc. by the suspension of a hydrophilic solid in a bath of an elastomeric or plastic substance wherein the solid is relatively insoluble followed by immersion of a suitable mold or form into the bath and thereafter leaching or dissolving away the hydrophilic solid material from the surfaces of the molded article.

Conveniently as a part of the ordinary process for the manufacture of rubber articles, the articles while still on the mold after the primary dip are given an additional thin coating of rubber material in a bath containing suspended therein a quantity of hydrophilic solid particles. The hydrophilic solid being insoluble in the naphtha or other hydrocarbon solvent employed for the rubber remains on the surface of the dipped article as discrete particles and the rubber articles are then given the conventional curing treatment. Following coating of the articles, they are dried, rolled and cured by heating, stripped from the form and thereafter subjected to a leaching or washing step in soapy water in accordance with conventional practice. This washing treatment however produces the additional function by dissolving those particles of the hydrophilic solid which are adjacent the surfaces of the molded articles.

Referring to the drawings, a specific application of the invention has been shown for illustrative purposes, and FIG. 1 embodies a rubber glove surface modified according to the present invention.

Figure 1:
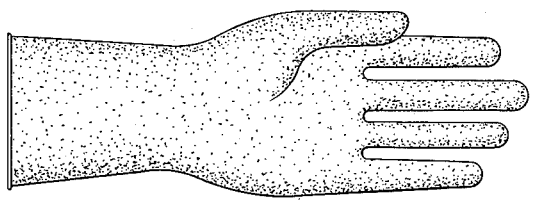

The newly developed process of producing surface-modified rubber products preferably consists of using natural or synthetic rubber or film forming plastic compounds in combination with a solvent for the rubber or rubber-like compounds with a water-soluble hydrophilic solid, which, after dipping, may be removed from the surface of the molded articles with an aqueous solvent, such as the usual soapy solution employed in the conventional washing of molded rubber articles. Crystalline solid materials such as common salt, sugar, sodium and potassium hydroxides, sodium carbonate and the like may be employed and have been found to have the desired characteristics for purposes of the invention.

It will be appreciated that the proportions of ingredients may be varied widely without departing from the spirit and scope of the invention. The preparations preferred for practicing the invention contemplate approximately 6 to 12 parts by weight of the elastomeric or plastic material, 75 to 80 parts by weight of a solvent for the elastomeric or plastic material and 12 to 30 parts by weight of the hydrophilic solid material.

In one embodiment of the invention, the form for the glove or other article is given the customary dip in a bath of latex, and this may be followed by one or more subsequent dippings, depending upon the thickness desired in the finished article and the concentration of solids in the coating bath. In order to produce a roughened surface on the finished article, the mold is then given a final dip in a bath of pure gum rubber cement containing, in addition to the usual rubber and naphtha or other solvent, small crystals of sugar suspended in the rubber solution. The sugar crystals will not dissolve in the cement because the sugar is insoluble in the naphtha solvent for the rubber.

Following this final dip in the rubber solution containing the sugar or other suitable water-soluble solid material, the glove may be dried, rolled and finally cured. After the glove is stripped from the form as in the regular process it may be subjected to the customary leaching or washing step in a bath, and during the washing treatment the sugar is dissolved in the aqueous soapy medium, and washed out of the pores of the overlying cement layer on the article.

The step of dissolving out the solid hydrophilic material from the outer surface of the article results in a multiplicity of small voids previously occupied by the hydrophilic solid particles.

It has been found that the voids or craters produced by this method of treatment provide a very desirable roughened and slip-resistant finish in the completed articles. The surface irregularities produced in the foregoing manner are permanently fixed and substantially modify the surface characteristics of the body as an integral part of the final structure. An important feature of the invention is that this treatment produces no weakening of the body as ordinarily results in the usual chemical roughening or etching processes.

The roughening or surface modification which results can be controlled within practical limits from an extremely light to very coarse roughening, by simply varying the amount of hydrophilic solid in the formula. Furthermore, additional modifications can be achieved by varying the particle size of the salt or other hydrophilic solid so that large voids can be made to occur at spaced points from one another on the surface of the article. Also the use of very small particle-size solid material can produce relatively small voids in the surface which can be spaced at any suitable distance from each other to produce any desired degree of roughening in the surface of the finished articles.

The following examples illustrate suitable coating compositions which can be employed in carrying out the principles of the invention. The formulae set forth below are purely illustrative of typical compositions employed in the rubber and plastics industry, and are not to be deemed as limiting the scope of the invention.

EXAMPLE 1

*Red neoprene cement-coating bath*

|  | Lbs. | Ozs. |
| --- | --- | --- |
| Neoprene GN (polychloroprene) | 60 |  |
| White Factice | 3 |  |
| Stearic Acid |  | 14 |
| Zinc Oxide | 3 | 10 |
| Light Magnesium Oxide | 1 |  |
| Lithopone | 4 |  |
| Whiting (Chalk pigment) | 7 |  |
| Orange Color | 2 |  |
| Red Color | 1 | 8 |
|  | 81 | 32 |

Figure 2:
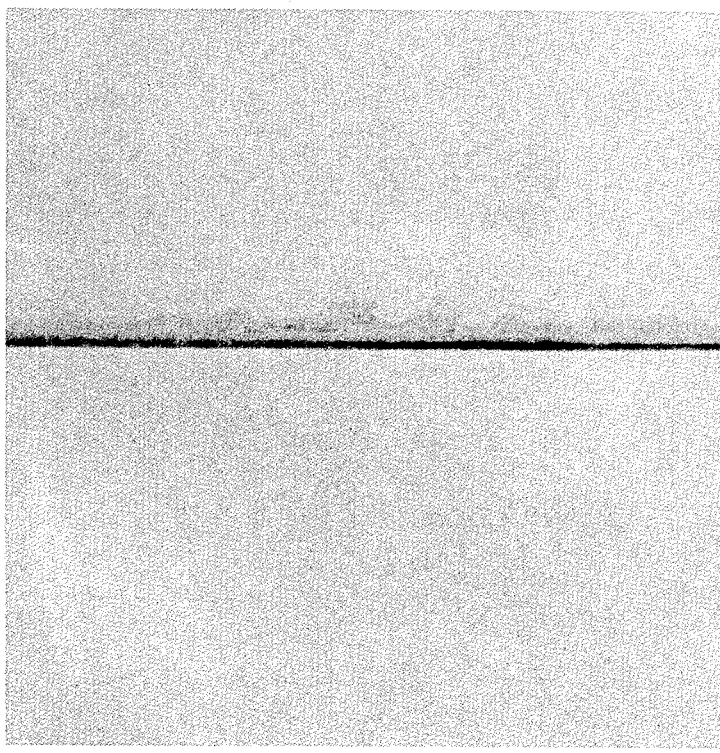
FIG. 2 is a photoprint view illustrating a cross section taken through the thickness of the surface-modified elastomer.
Figure 3:
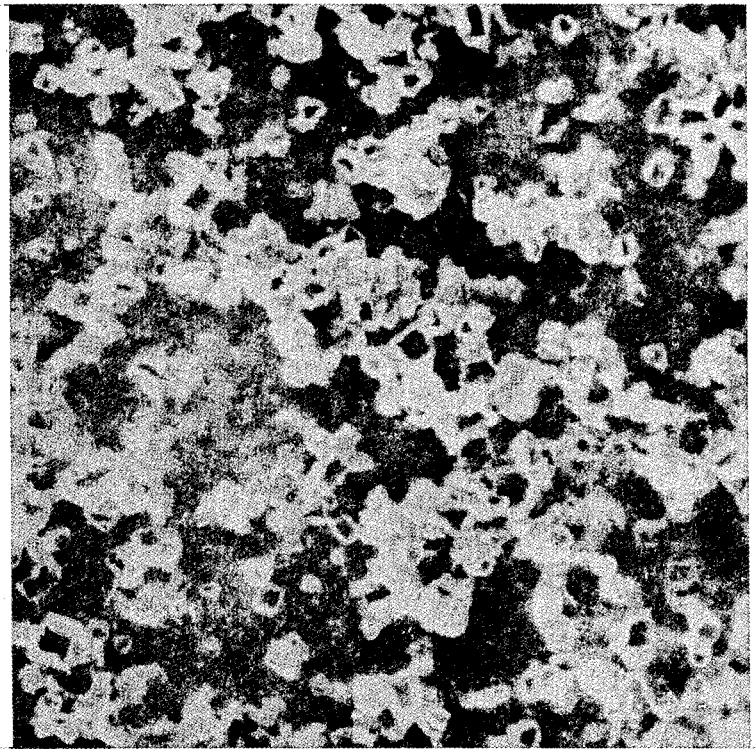
FIG. 3 is a magnified view in photoprint showing a pitted or modified surface produced according to the teachings of the present invention.

In formulating the rubber solution, the above materials are mixed together and dissolved in toluene in the proportion of approximately 3½ lbs. of stock to each gallon of the solvent. Porcelain glove forms are dipped in this solution and then in a second solution similar to the first, but containing in addition 60 lbs. of ordinary granulated sugar. The forms were then dried and cured as indicated above to produce a roughened friction-resistant surface similar to that shown in FIGS. 2 and 3 of the drawings.

EXAMPLE 2

*Red vinyl cement-coating bath*

|  | Lbs. | Ozs. |
| --- | --- | --- |
| Vinyl Plastic VYNS Type (copolymer of vinylacetate and vinylchloride) | 70 |  |
| Paraplex G-25 Plasticizer | 35 |  |
| Emery #9250 (an oil modified polyester plasticizer) | 8 |  |
| Lithopone | 4 |  |
| Orange Color | 2 | 8 |
| Red Color | 2 |  |
|  | 121 | 8 |

Paraplex G-25 is a stable, permanently soft, thermoplastic, high molecular weight plasticizer for polyvinyl chloride, which is manufactured by Rohm & Haas of Philadelphia, Pennsylvania. It is an alkyd-type polymeric polyester resin based on a polybasic acid esterified with a polyhydric alcohol.

The solid materials were mixed together and incoporated into an organic solvent in the proportion of approximately ¾ of a lb. of stock to one gallon of the solvent. Porcelain glove forms were then dipped into the resulting bath until the desired base thickness was built up on the forms, and thereafter the forms were given a single dip in a second bath containing the same composition, but in addition 75 lbs. of crystalline salt. After drying and curing in the usual manner, the salt was removed from the surface pores by leaching with an aqueous soap solution.

A very thin film of gum rubber covers the salt crystals, and the inherent permeability of this thin film permits the water to have access to the crystals. Initially the salt crystals absorb water, swell and tend to burst through the thin rubber film during the washing process. This produces a highly roughened surface.

Although substantially any solid hydrophilic substance may be employed without departing from the scope of the invention, hydrophilic crystalline materials are preferred due to their availability and high solubility characteristcs in aqueous soluton. By crystalline material is meant a solidified chemical substance bounded by plain surfaces, usually symmetrical, and having the property of being rapidly soluble in aqueous solution so that they are substantially removed from the surface of the elastomeric article, leaving surface voids and cavities. These surface cavities or cellular formations have approximately the configuration of the crystalline particles previously situated in the cavities.

As used herein the term "form" is intended to include both matrix and patrix forms or molds.

The solvent for the elastomeric material in the coating composition which contains the hydrophilic solids must be water-immiscible so as to maintain the integrity of the suspended solid matter until the coating has been finally cured on the surfaces of the article being treated.

This application is a continuation of applicants' copending application Serial No. 525,617, filed August 1, 1955 (now abandoned).

It will be appreciated that although specific embodiments of the invention have been shown and described herein, the methods and compositions may be widely varied without departing from the spirit or the scope of the invention.

We claim:

1. The method of producing irregular surface characteristics on a water-impervious elastomeric article which comprises applying to said article a permeable coating of an elastomeric composition, said composition containing an elastomeric material, in a water-immiscible organic solvent having solid water soluble particles of hydrophilic material suspended therein, curing the coating to eliminate the solvent and solidify the composition, and then washing the elastomeric article in an aqueous medium to dissolve the hydrophillic solid particles and produce voids in the surface of the article.

2. The method of producing voids and irregular surface characteristics on a water-impervious elastomeric article which comprises providing said article with a thin permeable coating composition, said coating composition consisting essentially of from approximately 6 to 12 parts by weight of an elastomeric material, 75 to 80 parts by weight of a water-immiscible solvent for the elastomeric material, and 12 to 30 parts by weight of particles of water soluble hydrophilic solid material, curing the coated article, and then washing the article with an aqueous medium to dissolve the solid hydrophilic material from the surface of the article, leaving voids in place thereof.

3. The method of producing an elastomeric water-impervious article having a coarsely roughened surface comprising the steps of dipping a form into an aqueous bath of an elastomeric material to form a relatively water-impervious base coating on the form, thereafter dipping the coated form into a coating composition containing an elastomeric material in a water-immiscible solvent having water soluble hydrophilic crystalline particles suspended therein to form a thin permeable coating over the water-impervious base coating, drying the article to solidify the coatings, and washing the article with an aqueous solution which first causes the crystalline material to swell, the enlargement of the particles bursting through the outer surface of the rubbery material, and then dissolves the crystalline material, thereby producing a roughened surface on the article.

4. The method of producing a rubber article having a roughened surface which comprises forming a relatively water-impervious base layer of elastomeric material of substantial thickness and strength by dipping a form in a water-miscible bath of latex material, applying externally to the water-impervious base layer a thin permeable coating containing an elastomeric material in a water-immiscible organic solvent having a high concentration of suspended particles of water soluble hydrophilic crystalline material therein, solidifying the outer coating, and treating the surface of the article with an aqueous solution to dissolve and remove the exposed crystalline material, thereby producing irregularities in the surface.

5. The method of roughening the surface of a rubber article which comprises coating a form for the article with an elastomeric material, drying the thin permeable coating and applying thereto a coating of an elastomeric material in a water-immiscible solvent containing particles of water soluble hydrophilic crystalline material in suspension, drying the second coating to produce a relatively thin permeable layer with the crystalline material embedded therein, and treating the article with an aqueous medium to swell and then dissolve the crystalline material and produce voids in the surface thereof, the swelling of the crystalline material bursting the outer surface of the thin permeable layer to increase the roughening effect.

6. The method of roughening the surfaces of water-impervious rubber articles which comprises providing said articles with a thin permeable surface coating of a curable rubbery material in a water-immiscible solvent, the coating containing therein suspended water soluble hydrophilic solid particles, drying and curing the coating of rubber material, and washing the surface of the article with an aqueous medium to remove therefrom the hydrophilic solids, producing surface irregularities on the article.

References Cited in the file of this patent

UNITED STATES PATENTS

| | | |
|---|---|---|
| 1,710,617 | Haddon et al. | Apr. 23, 1929 |
| 1,988,709 | Barns | Jan. 22, 1935 |
| 2,266,716 | Robertson | Dec. 16, 1941 |
| 2,353,877 | Chollar | July 18, 1944 |
| 2,393,298 | De Laney | Jan. 22, 1946 |
| 2,503,139 | Fabregues | Apr. 4, 1950 |
| 2,736,926 | Johnson | Mar. 6, 1956 |
| 2,834,056 | Miller | May 13, 1958 |
| 2,867,849 | Drew et al. | Jan. 13, 1959 |

UNITED STATES PATENT OFFICE
CERTIFICATE OF CORRECTION

Patent No. 2,997,746                                August 29, 1961

William J. O'Brien et al.

It is hereby certified that error appears in the above numbered patent requiring correction and that the said Letters Patent should read as corrected below.

Column 4, line 11, for "soluton" read -- solution --; column 5, line 14, strike out "thin permeable", and insert the same before "coating", second occurrence, in line 15, same column.

Signed and sealed this 6th day of February 1962.

(SEAL)
Attest:

ERNEST W. SWIDER                                DAVID L. LADD
Attesting Officer                                     Commissioner of Patents